July 1, 1958 J. R. PIERCE 2,841,738

HIGH FREQUENCY AMPLIFIER

Original Filed Jan. 11, 1946 5 Sheets-Sheet 1

INVENTOR
J. R. PIERCE
BY N. S. Ewing
ATTORNEY

July 1, 1958 J. R. PIERCE 2,841,738

HIGH FREQUENCY AMPLIFIER

Original Filed Jan. 11, 1946 5 Sheets-Sheet 2

INVENTOR
J. R. PIERCE
BY N. S. Ewing
ATTORNEY

July 1, 1958 J. R. PIERCE 2,841,738

HIGH FREQUENCY AMPLIFIER

Original Filed Jan. 11, 1946 5 Sheets-Sheet 3

INVENTOR
J. R. PIERCE
BY
N. S. Ewing
ATTORNEY

July 1, 1958 J. R. PIERCE 2,841,738

HIGH FREQUENCY AMPLIFIER

Original Filed Jan. 11, 1946 5 Sheets-Sheet 4

INVENTOR
J. R. PIERCE
BY N. S. Ewing
ATTORNEY

July 1, 1958 J. R. PIERCE 2,841,738

HIGH FREQUENCY AMPLIFIER

Original Filed Jan. 11, 1946 5 Sheets-Sheet 5

INVENTOR
J. R. PIERCE
BY N. A. Ewing
ATTORNEY

United States Patent Office 2,841,738
Patented July 1, 1958

2,841,738

HIGH FREQUENCY AMPLIFIER

John R. Pierce, Berkeley Heights, N. J., assignor to Bell Telephone Laboratories, Incorporated, New York, N. Y., a corporation of New York Original application January 11, 1946, Serial No. 640,597, now Patent No. 2,636,948, dated April 28, 1953. Divided and this application November 22, 1952, Serial No. 322,104

19 Claims. (Cl. 315—3.5)

This invention relates to devices for amplifying high frequency electrical waves, particularly such devices in which amplification is had through interaction between an electron stream and a high frequency electric field associated with the waves to be amplified over an extended distance such as a distance of more than a wavelength along the transmission path of the waves. It relates also particularly to such devices arranged to couple efficiently into a transmission system and be suitable for transmitting a relatively wide band of frequencies.

This application is a division of application Serial No. 640,597 filed January 11, 1946, now Patent 2,636,948, issued April 28, 1953.

In one form of amplifying device disclosed in the parent application an elongated wire helix constitutes a transmission path for the waves to be amplified, and the electron stream flows along the axis of the helix in the direction of transmission of the waves and within the electric field thereof. The arrangement is such that the axial velocity of the electric field is substantially uniform along the path and equal to the velocity of the electron stream. Under these conditions the electric field acts on the electron stream and the electron stream reacts on the field in such a manner that the waves traveling along the path in the same direction as the electron stream increase in amplitude with distance of travel. Thus, the device acts as an amplifier for waves traveling in the same direction as the electron stream. Furthermore, the velocity of wave propagation along the helix is substantially independent of frequency to such an extent that the gain-producing interaction between waves and electron stream can be maintained over a wide frequency range.

The present invention in one aspect resides in a device of the general type first described in which the wave transmission path comprises a multi-section wave filter structure that extends uninterruptedly along the electron stream from a wave input connection to a wave output connection. The filter structure may comprise a wave guide provided with transverse conductive baffles or other elements forming a succession of resonators or filter sections which together constitute a band-pass filter having a pass-band embracing the frequency range of the waves to be amplified. In such a device the amplification is confined to the pass band of the filter, and also the device will transmit the waves, though unamplified, in the event the electron stream fails.

In another aspect the invention resides in a high frequency amplifying device of the general type described in which the electrons of the stream pass along a wave transmission structure of such character that interaction between the electrons and the waves to be amplified occurs primarily in discrete spaced regions. These interaction regions along the path may be determined by respective portions of the wave transmission structure in the nature of resonators, for example, that intensify the electric field of the waves in such regions, or by other portions of the transmission structure that partially shield the path of the electron stream between the interaction regions so that the strength of the electric field of the wave is reduced along the path except in the regions where it is desired to have electrons and the waves interact.

In accordance with a salient feature of the invention the velocity of the electron stream along the wave transmission path in a device of the kind last described can be and is made materially less than the velocity of the waves, and various practically significant advantages are thereby secured.

The nature of the present invention and its various features, objects and advantages will be more fully understood from the following detailed description and the accompanying drawings, in which.

Figure 9:
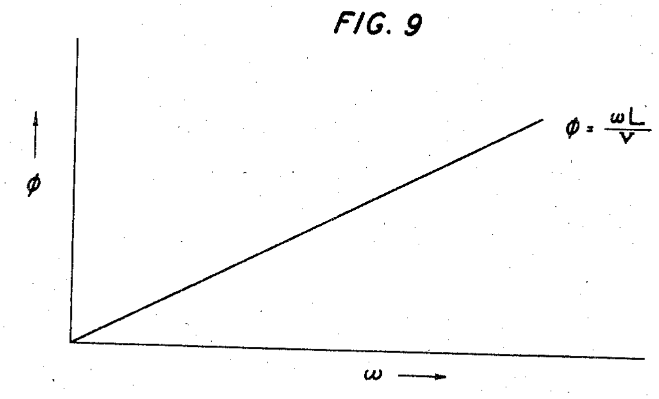
Figs. 9 and 10 are diagrams explanatory to the Fig. 5 and Fig. 6 embodiments of the present invention.
Figure 10:
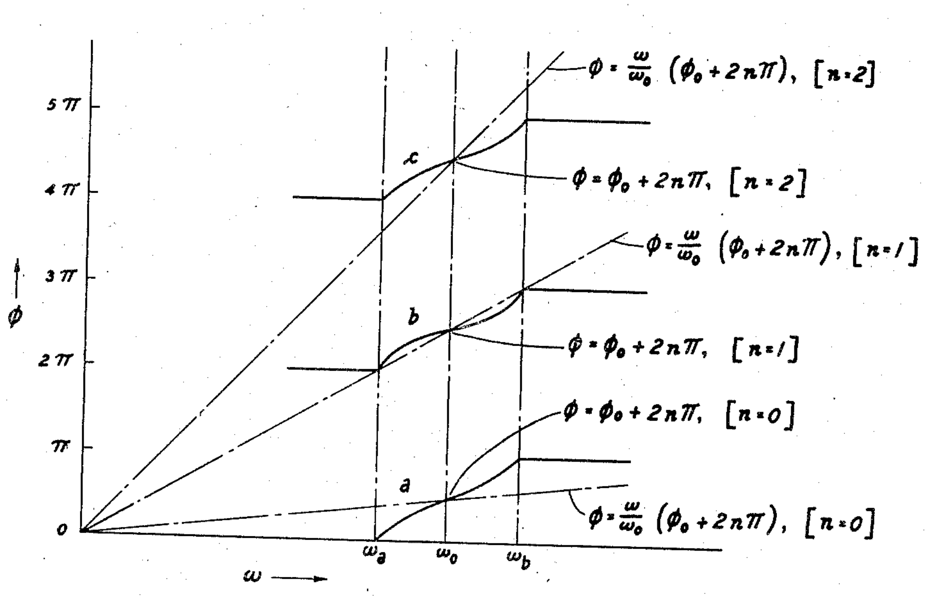

While the present invention is illustrated specifically by Figs. 4, 5, 5A, 5B, 6, 6A, 6B and the explanatory Figs. 9 and 10, other figures and the descriptions of them taken from the parent application are included herein to provide related background information.

Figure 1A:
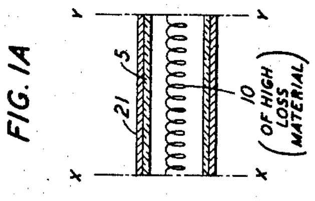
Fig. 1A illustrates an alternative method of introducing high frequency loss into the helical coil path.
Figure 1:
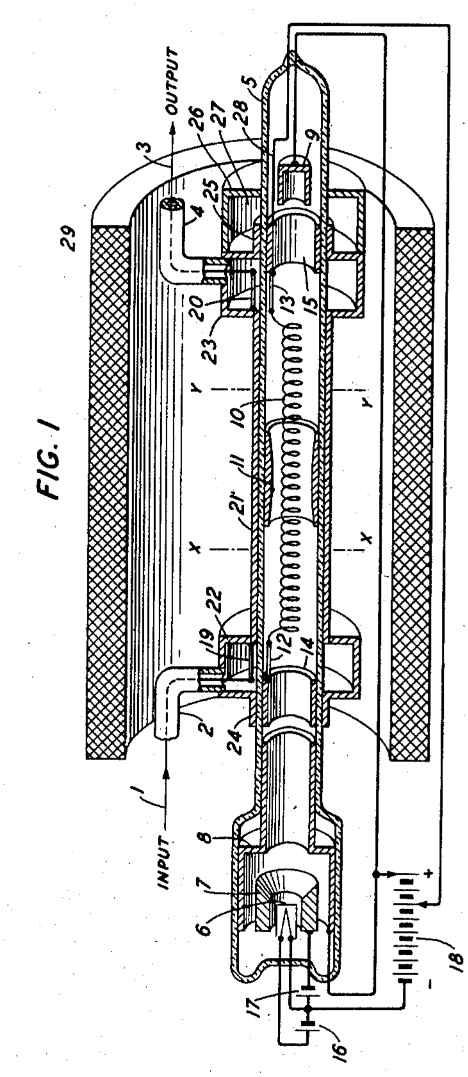
Fig. 1 shows a traveling wave amplifier in which the wave transmission path through the amplifying device comprises a helical coil of solid conductor with coupling thereto by means of coaxial transmission lines.

Fig. 1 illustrates a wave amplifying device of the parent application arranged for insertion into a coaxial line transmission circuit. The coaxial line is broken and the input end of the device is connected to the line end designated 1, 2. The output end of the device is connected to the line end designated 3, 4. The device comprises an evacuated envelope 5 containing an electron emitting cathode 6 which may be indirectly heated as shown, an electron focussing electrode 7, an accelerating electrode 8, a collecting electrode 9, the helical coil 10, high frequency loss material 11, coupling members 12 and 13 and the coil terminating cylindrical members 14 and 15. The cathode is heated from potential source 16 and the focussing electrode is biased from source 17. Electrodes 8 and 9, the helical coil 10 and the members connected to it are biased positively with respect to the cathode through connections to source 18 so that a stream of electrons is projected from the cathode, through the coil along its axis at a suitable velocity and to the collector 9. A solenoid 29 is shown surrounding the coil 10 to provide a strong unidirectional magnetic field along the axis thereof and so prevent deviation of the electron stream from its desired course by an outside magnetic influence such as that of the earth's magnetic field. Each end of the helical coil is coupled to the appropriate coaxial line end. For instance, the input end of the coil (at the input end of the device) is coupled to the coaxial line 1, 2 through the proximity of strip member 12 (joining the end of the coil to the cylindrical member 14) and the strip member 19 (joining the central conductor 1 of the coaxial line to the outer conductor 2 through the interconnected shielding member 22). The lengths of the coupling strip members 12 and 19 are preferably the same and substantially electrically one quarter or $$\left(\frac{n}{2}+\frac{1}{4}\right)$$

of the wavelength of the wave to be amplified where $n$ is an integer. The degree of coupling between th members 12 and 19 may be varied by rotating the envelope 5 about its axis to vary their proximity. The output end of the coil is coupled to the coaxial line 3, 4 in the same manner through the proximity of the strip members 13 and 20.

The members 21, 22, 23, 24 and 25 (of conducting material) are electrically connected and serve to enclose and shield the helical coil, its end terminations, the coaxial line end portions and the arrangements for coupling the coil and the coaxial line. The proximity of member 14 and the tubular portion of 25 at the output end of the coil causes these members to form by-pass capacitances to prevent the leakage of high frequency energy. The members 26 and 25 together form a toroidal-shaped cavity resonator with a gap 27 which is in close proximity to the lead 28 connecting members 15 to source 18. This resonator is tuned in the operating frequency range and being coupled to the lead 28 it acts as a choke and prevents excessive high frequency loss through that lead. If a lead is brought out at the input end of the helix, or it is otherwise desirable, a similar choke may be employed there, in which case the member 24 may serve as part of the hollow resonator.

The loss material 11 is shown as a hollow cylinder having the wall thickness tapering along the axis from the center and encircling the helical coil in the region of its longitudinal center. This material may be a mixture of ceramic and conducting material or other substance capable of absorbing energy from a high frequency field. The material may be shaped and distributed along the helix in any suitable manner to distribute the loss introduced by the energy absorption along the helix as desired. The introduction of controlled high frequency loss along the wave transmission path (which in this embodiment comprises the helical coil 10) is an important feature of the invention because the amount of amplification possible with the device may be seriously limited by self-oscillation due to high frequency energy being transmitted in the reverse direction from the output end to the input end. The tendency toward such oscillation may be controlled by this introduction of transmission loss. The loss may be distributed uniformly along all or part of the transmission path between the input and output of the device. However, the applicant has found that under some conditions at least it is advantageous to distribute the loss non-uniformly and often more desirable to concentrate the loss near the center of the device rather than at the ends.

As an alternative to the insertion of energy absorbing material such as 11 in Fig. 1 other means may be employed to insert high frequency loss. One such alternative is indicated in Fig. 1A which shows the central portion of a device such as that of Fig. 1 in which rather than incorporating loss material such as 11 in Fig. 1 the helical coil itself is constructed of material having controllable loss. Thus, the coil conductor may be of high loss material such as resistance wire or it may be of low loss material plated with iron or other high loss material or a conductor of high loss material may be plated with low loss material and in any case the loss so introduced may be either uniformly or non-uniformly distributed as desired.

The axial length of the coil is preferably several wavelengths and it appears from present knowledge that it may be as long as practical considerations permit.

In operation, the input high frequency wave reaches the device over the coaxial line conductors 1 and 2. It reaches the coupling strip 19 (which as mentioned is preferably one-quarter or $$\left(\frac{n}{2}+\frac{1}{4}\right)$$

electrical wavelength long where $n$ is an integer) and is transferred to the input end of the helical coil 10 through the coupling between strip 19 and strip 12 (which also is preferably one-quarter or $$\left(\frac{n}{2}+\frac{1}{4}\right)$$

electrical wavelength long). The wave traverses the coil 10 to the coupling strip 13 at the output end of the coil. It is then transferred to the strip 20 by the coupling between 13 and 20 (both of which are preferably one-quarter or $$\left(\frac{n}{2}+\frac{1}{4}\right)$$

electrical wavelength long) and thence delivered to the coaxial line 3, 4. Thus, there is a direct path for the high frequency wave through the device regardless of the electronic features. The high frequency path between the input and output ends of the helical coil is such that though the speed of the wave along the wire of the helix be about the same as that of light the speed of the wave along the axis of the helix may be a small fraction of that and comparable to an electron speed corresponding to a reasonable accelerating voltage. Since, for amplification of the wave it is necessary that the wave velocity along the axis of the coil be comparable to the electron velocity therealong, the coil dimensions (taking into consideration the frequency of the wave to be amplified), the dimensions of the electron tube and the electron accelerating voltages are correlated to attain that end. Close agreement between these velocities is desirable though some tolerance is obviously necessary and unavoidable when the wave covers a wide frequency band. Close figures on permissible tolerance are not available. It appears, however, that the velocities should be well within 10 percent of agreement but possibly a 25 percent departure may be permissible. At the present time it appears that the term "comparable" used above or the phrases "substantially the same" or "substantially equal" when used to describe the relationship of the two velocities should be understood to permit a tolerance of as much as 25 percent. In practice, with given apparatus and operating frequency range the electron velocity may be adjusted to give optimum performance.

Any suitable high frequency source and load may be connected to the input and output coaxial terminals of the device.

Early tests of an arrangement similar to the Fig. 1 embodiment with the Fig. 1–A modification indicated an amplification gain of over 10 decibels over a band width of more than 200 megacycles at a wavelength about 11 centimeters. The helical coil having 13 turns per inch was one-quarter inch in diameter and 16 inches long. An electron accelerating voltage of 2,000 was employed.

Figure 2:
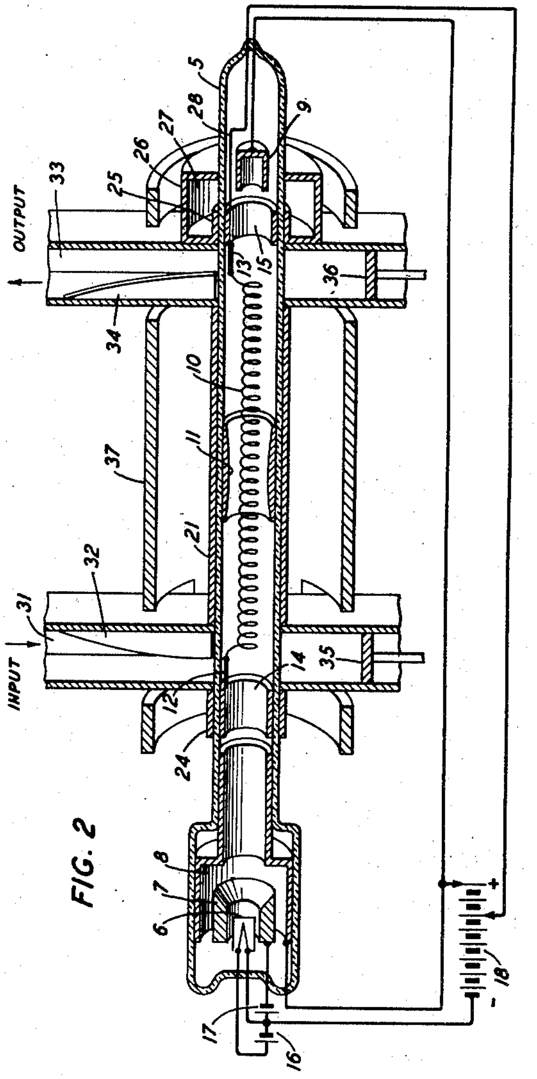
Fig. 2 is similar to Fig. 1 except that coupling to the helical coil is by means of hollow wave guides.

Fig. 2 illustrates an arrangement employing a helical coil transmission path as shown in Fig. 1 but in which the transmission path external to the device is a wave guide and the coupling at each end of the coil is therefore to a wave guide structure rather than to a coaxial line structure as in Fig. 1. The wave guide transmission path external to the amplifying device is broken making two end portions 31 and 33 between which the helix of the device is inserted. The guide shown is of rectangular cross-section and the two end portions are placed parallel to each other so that the evacuated envelope 5 of the amplifying device may be inserted through both guide portions transversely and also the shielding members 21, 24 and 25 and so that the helical coil 10 completes the transmission path between the end portions of guide. As in Fig. 1, wave energy coupling to the input and output ends of the helical coil 10 is effected through the one-quarter or $$\left(\frac{n}{2}+\frac{1}{4}\right)$$

wavelength coupling strips 12 and 13. Tapered fins of conducting material 32 and 34 are placed in the guide portions as shown to concentrate the field and increase the possible coupling with the strips 12 and 13, respectively. The degree of coupling to these strips may be varied by rotating the envelope 5 about its axis to change the spacings between the strips 12 and 13 and the fins 32 and 34. Maximum coupling is had when the strips are closest to the gap between the fin and the opposite wall of the guide. The guide portions are extended beyond the intersections with the helix and are closed at the ends by the adjustable plungers 35 and 36. By these, the lengths beyond the coupling strips 12 and 13 may be adjusted as, for instance, to one-quarter or $$\left(\frac{n}{2}-\frac{1}{4}\right)$$

wavelength so that with the one-quarter or $$\left(\frac{n}{2}+\frac{1}{4}\right)$$

wavelength strips 12 and 13 each end of the helix is coupled to the appropriate wave guide portion by two coupled tuned circuits which as is well known may be adjusted to pass a band of frequencies in the manner of a band-pass filter. At the input end of the helix one of the tuned circuits is the strip 12 and the other the portion of wave guide between 12 and the plunger 35. At the output end of the helix the two tuned circuits are the strip 13 and the portion of guide between 13 and the plunger 36.

The loss material 11, the by-pass capacitances between members 14 and 24 and between 15 and 25, the resonant choke formed by members 25 and 26 and the general operation of the arrangement of Fig. 2 are the same as described in connection with Fig. 1. In place of the solenoid 29 of Fig. 1 a shield 37 is shown. The shield 37 may be of soft iron and serves to protect the device from external magnetic fields. Either a solenoid such as 29 of Fig. 1 or the shield 37 of Fig. 2 or both together may be used for that purpose. Any suitable input source and output load may be connected to the input and output guide portions.

Figures 3, 3A:
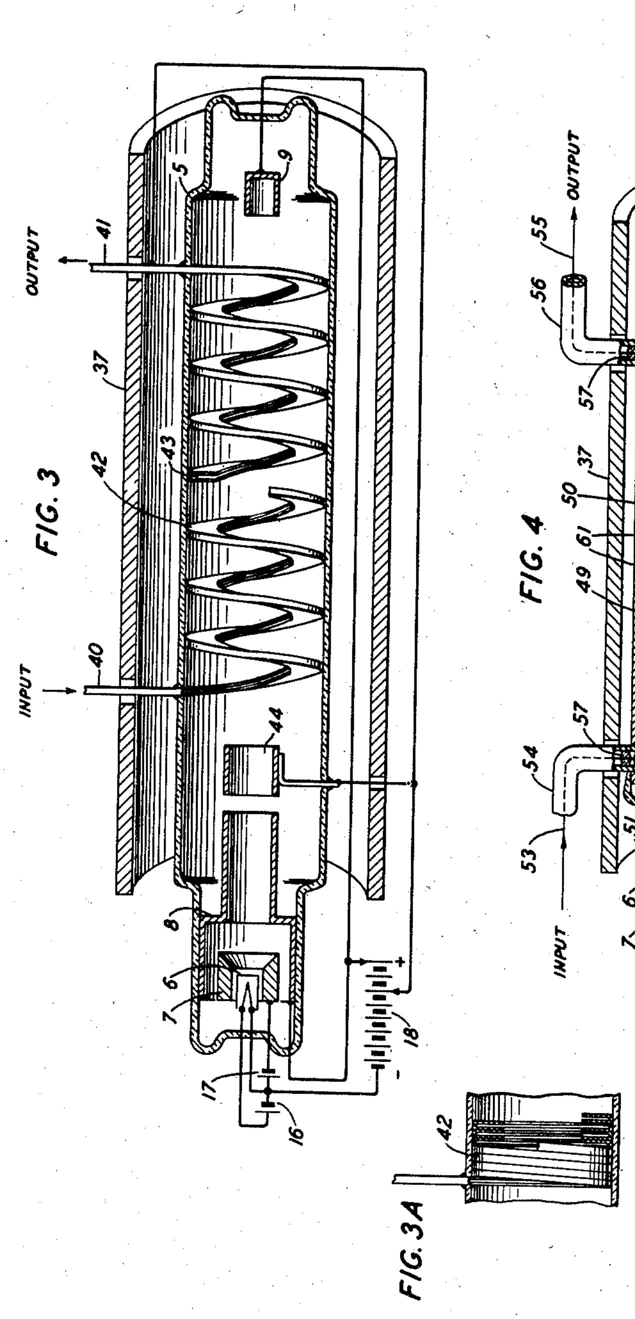
Fig. 3 shows an amplifier in which the wave transmission path through the amplifying device comprises a helical coil formed by coiling a wave guide.
Fig. 3A illustrates an alternative detail of Fig. 3.

Fig. 3 illustrates an arrangement in which rather than a wire helix as shown in Figs. 1 and 2 a wave guide structure is formed into a helix 42 along the axis of which the wave may travel at approximately the velocity of the electron stream and thereby derive energy from it. In Fig. 3 the wave guide which provides the transmission path external to the amplifying device is not broken but continues through the device. Along the path of the electron stream the guide is formed into a helix surrounding the electron stream. The wall of the guide facing inwardly toward the axis of the helix and the electron stream is opened so that the electric field associated with a wave transmitted through the guide may extend out from the interior of the guide into the path of the electron stream and interact therewith.

The components of the device which correspond to those of Fig. 1 or Fig. 2 and function the same are designated the same as in those figures. In general, the evacuated envelope and the electronic features of Fig. 3 are the same as in Fig. 1. An additional accelerating electrode 44 is shown. In Fig. 3 it is, of course, necessary that the wave guide enter and leave the envelope through air-tight seals.

The high frequency wave enters the helix from the portion of guide designated 40 and leaves the helix through the portion of guide designated 41. Due to the helical formation of the guide the velocity of the wave along the axis of the helix is caused to be substantially the same as the velocity of the electron stream traveling along the axis in the same direction and as explained in connection with Fig. 1 this is a condition under which amplification of the wave may be had due to the transfer of energy from the electron stream to the axial high frequency field associated with the wave. The arrangement will therefore function as an amplifier in the same manner as Fig. 1 and as described in connection therewith. In order to provide a desired amount of high frequency attenuation in the device as was done with the loss material 11 in Fig. 1 similar material designated 43 is shown in the interior of the guide. As in Fig. 1 this material may extend along the guide in such quantity as necessary to distribute the loss as desired. As an alternative the interior of the guide may be plated with high loss material such as iron or the attenuation may be obtained in any other desirable manner. In order to make a clear showing in the drawing the turns of the helix are shown in Fig. 3 more separated along the axis than would ordinarily be the case in an actual device. The turns may be as close together as desired or in actual contact as illustrated in the fragmentary sketch Fig. 3A which shows an end portion of a helix adaptable to Fig. 3. It is obvious that the equivalent of Fig. 3A may be had by placing a spiral of edge wound flat conductor inside and in contact with a conducting cylinder. This subject-matter is disclosed and claimed in my application Serial No. 304,536 filed August 15, 1952, now Patent No. 2,792,519, issued May 14, 1957, which is a division of the above-mentioned parent of this application.

Figure 4:
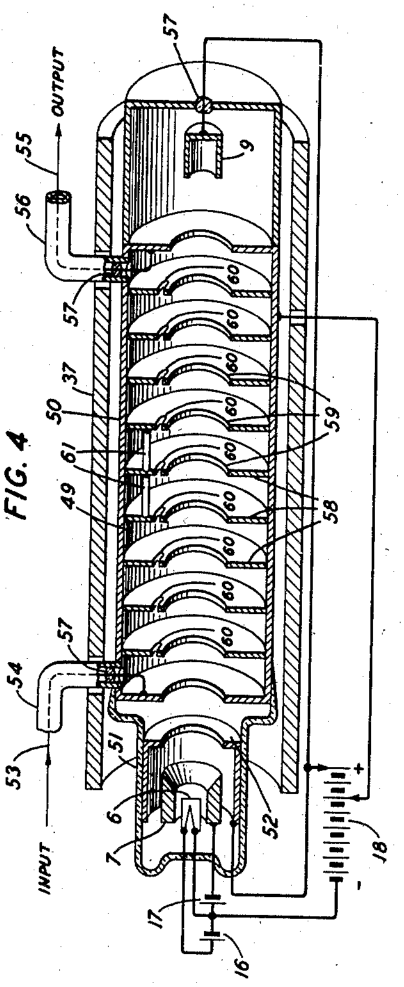
Fig. 4 illustrates an embodiment of the present invention in which the wave transmission path through the device comprises a wave guide with spaced transverse baffles.

Coming now to the first of the figures that relate specifically to the present invention, Fig. 4 illustrates an embodiment in which a section of cylindrical wave guide with transverse conducting partitions or baffles provides the transmission path through the amplifying device. The partitions or baffles function, in part, to reduce the velocity of the wave through the guide so that the axial velocity of the wave and the velocity of an electron stream along the axis may be about the same. In Fig. 4 the shell 50 of the wave guide 49 is a part of the evacuated envelope and is sealed to the glass portion of the envelope 51. In this showing the transmission path external to the device is a coaxial line. This line is broken for insertion of the wave guide portion of the device, conductors 53 and 54 being joined to the input end of the device and conductors 55 and 56 being joined in the output end. The insulating beads 57 shown at both places where the coaxial structure joins the wave guide and where the lead to the collector 9 enters the guide are to maintain closure of the evacuated envelope. The inner conductors 53 and 55 are terminated in loops as shown to couple with and provide for the transfer of high frequency energy to and from the wave guide. Other types of path external to the wave guide portion of the device and other suitable coupling arrangements may be employed.

The baffles or transverse partitions 58 are of conducting material and are in electrical contact with the shell 50 of the guide so that each baffle closes the guide transversely except for the apertures therein such as 59 and 60. The apertures 59 are aligned along the axis of the guide. They provide for transmission of the high frequency wave through the guide and permit projection of an electron stream along the axis to interact with the axial electric field associated with the traveling wave. The aperture 60 located out from the center or axis of the guide may or may not be provided. The transverse baffles with the central apertures 59 only will act to slow the axial velocity of the high frequency wave through the guide to that of the electron stream in the same direction so that the desired interaction may be had as has been previously described. The apertures 60 may be provided to furnish additional direct coupling between the opposite sides of each baffle to give a desirable band-pass filter characteristic to the transmission of the guide and facilitate the amplification of a wide band of frequencies.

In order to provide desirable high frequency attenuation in Fig. 4 as in the previously described structures, loss material 61 is shown placed in the interior of the guide. This material may be distributed along the guide as required for proper distribution of the transmission loss. The desired loss may be had by other means such as by using high loss material in the guide structure or by plating portions of it with high loss material.

Except for the enclosing envelope for the evacuated space and the differently shaped accelerating electrode 52 taking the place of the electrode 8, the arrangement for projecting the electron stream along the high frequency wave transmission path is the same as shown for the previously described structures and the various similar components are designated as in the previous figures. The operation of the embodiment shown in Fig. 4 to amplify a high frequency wave transmitted therethrough is, in general, the same as described in connection with the previous figures.

Figure 5:
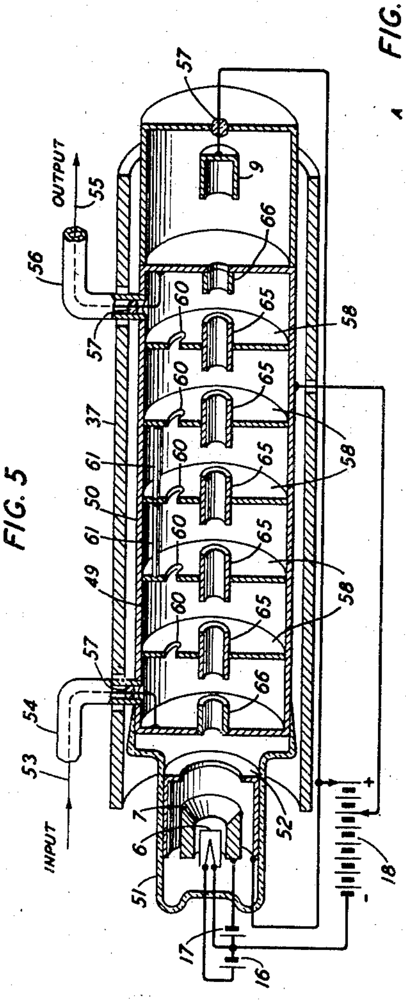
Fig. 5 illustrates a modification of Fig. 4 in which the central apertures in the baffles are fitted with cylinders extending longitudinally along the guide.

Fig. 5 illustrates an embodiment of the present invention which is a modification of Fig. 4 and in which the central apertures in the baffles and ends of the wave guide have been fitted as shown with lengths of conductive hollow cylinders or tubes 65 and 66. These cylinders further isolate the spaces between the baffles so that the wave guide becomes in effect a series of toroidal-shaped resonators placed end-to-end and coupled through the apertures between them. The characteristic of the transmission path through the guide here also is that of a band-pass filter. The velocity of the high frequency wave along the axis of the cylinders 65 is slowed to approximate that of the electron stream projected therethrough and amplification of the wave may be obtained as previously described.

Figure 5A:
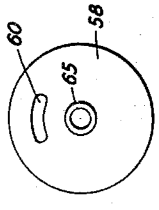
Figs. 5A and 5B illustrate different arrangements of openings which may be used in the baffles of Figs. 4 or 5.
Figure 5B:
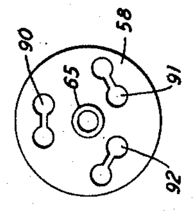

Figs. 5A and 5B are face views of one of the baffles 58 of Fig. 5. Fig. 5A shows more clearly the shape of the openings 60 of Fig. 5. Fig. 5B shows at 90, 91 and 92 openings alternative to the openings 60 which may be used when it is desired to control the filter characteristic through alteration of the resonant characteristics of the openings coupling the various sections of the filter as will be referred to later.

Figures 6A, 6B:
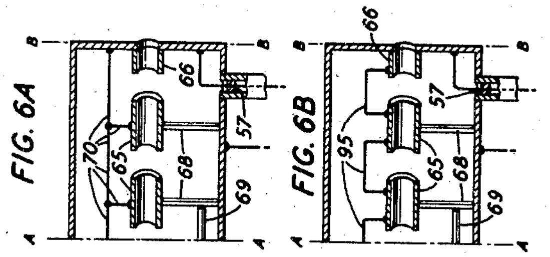
Fig. 6A shows a modification of Fig. 6 in which interconnections between the cylinders are added to alter the filter circuit characteristic and provide means for adjustment of the characteristic.
Fig. 6B shows an alternative method of making the additional interconnections of Fig. 6A.
Figure 6:
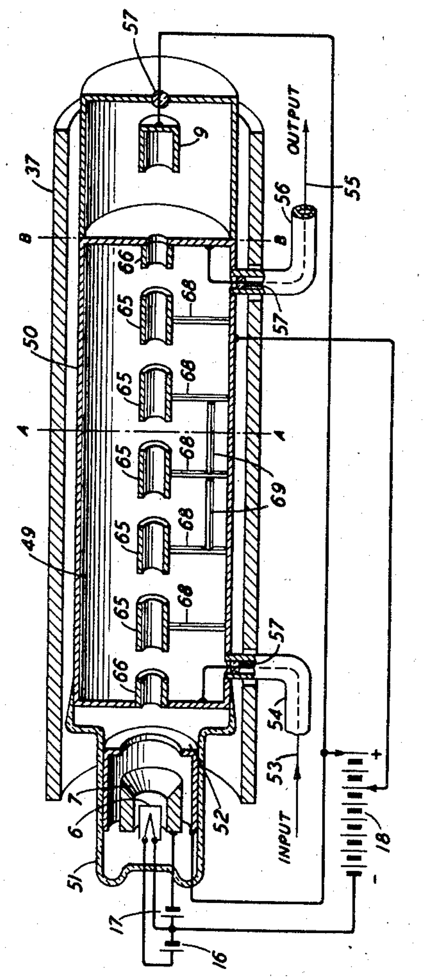
Fig. 6 shows a further modification of Fig. 4 wherein the baffles are reduced to conducting strips or pedestals by which the cylinders of Fig. 5 are supported.

Fig. 6 shows an embodiment of the present invention which is a modification of Fig. 5 in which the cylinders 65 are supported by conducting rods 68 rather than by the baffles. It may be considered that the apertures 60 of Fig. 5 have been so enlarged that the baffles 58 of Fig. 5 have contracted to become the rod supports 68. Like the Fig. 5 device the high frequency transmission characteristic is that of a band-pass filter. The coaxial line connectons to the input and output ends of the guide are made by tapping the central coaxial conductors appropriately along the end supporting rods as shown. Loss material 69 is inserted as required to provide a desired distribution of attenuation in the transmission path as previously explained. The electron stream along the axis of the device is produced as in the previously shown embodiments and in the same manner amplification of a high frequency wave passing through the device may be had by making the axial velocities of the wave and the electron stream alike.

Fig. 6A shows a modification of the Fig. 6 arrangement to illustrate how conductors 70 interconnecting the cylinders 65 and 66 may be used to add inductive elements and vary the filter type characteristic of the transmission path. The characteristic may be varied by altering the lengths and other characteristics of the conductors 70 to alter the inductance introduced by them.

Fig. 6B illustrates an alternative to the Fig. 6A arrangement. Here the conductors 95 joining the adjacent cylinders take the place of the conductors 70 in Fig. 6A and provide similar facilities.

It has been indicated above that in the operation of the various structures illustrated the velocities of the high frequency wave and the electron stream should be substantially the same along the common path. Where the energy to be amplified covers a band of frequencies it is desirable that this relation hold over the whole band and this does not present any difficulty where the transmission path is a uniform line. However, when an arrangement (such as that of Fig. 5 or Fig. 6) having a band-pass filter characteristic is employed, special precautions are required in order to approach the desired condition as nearly as possible. This is especially so when the operating band of frequencies is an appreciable portion of the pass-band of the filter circuit, and is due to the fact that the phase-changes over the pass-band between filter sections, inherent in the filter circuit, tend to change the phase relation between the electrons and the electric wave along their path through the device.

Consider first the case of a uniform transmission line with a wave traveling along it with the velocity $v$. The phase difference or angle between any two points along the line may be plotted against the angular frequency as shown in Fig. 9 where $\Phi$ is the phase angle or difference,
$\omega$ is the angular frequency, and $$\phi=\frac{\omega L}{v}$$

where

L is the distance along the line between the two points and
$v$ is the velocity of the wave along the line.

Now, in order for the electrons to "keep up with" or travel at the same speed as the wave at all frequencies, it is only necessary to make the velocity of the electrons ($u_0$) the same as the wave velocity ($v$), inasmuch as the curve of Fig. 9 is a straight line; and when $u_0=v$ the "electronic phase difference"

$$\frac{\omega L}{u_0}$$

is equal to the "'circuit phase difference"

$$\frac{\omega L}{v}$$

for any length L or frequency $\omega$.

When we have a band-pass filter rather than a uniform line, the case is somewhat different. In going through the frequency band, the phase difference between sections of the filter changes by a definite amount. This change is $\pi$ radians for many filters and if phase difference is plotted against frequency for such a filter, we may get curves as shown in Fig. 10 where $\Phi$ is the phase angle or difference,
$\omega$ is the angular frequency,
$\omega_0$ is the angular frequency at mid-band of the filter,
$\omega_a$ is the angular frequency at the lower cut-off of the filter,
$\omega_b$ is the angular frequency at the upper cut-off of the filter.

Three curves ($a$, $b$ and $c$) are shown in which the phase change ($\phi$) between filter sections is shown as between 0 and $\pi$, $2\pi$ and $3\pi$ and $4\pi$ and $5\pi$ respectively over the pass-band $\omega_a$ to $\omega_b$. The same sort of operation is had whether it is said the phase changes from 0 to $\pi$, from $2\pi$ to $3\pi$, from $4\pi$ to $5\pi$ or, in general, from $0+2n\pi$ to $\pi+2n\pi$ (where $n$ is an integer), because at a given frequency a change in phase by $2n\pi$ means no change in phase at all. Hence for the purpose of this discussion the curves $a$, $b$ and $c$ are all equally good representations of the phase characteristic of the filter.

In order to define the velocity of the wave, let the phase difference between sections at mid-band frequency $\omega_0$ be represented as $\phi_n=\phi_0+2n\pi$. Thus, $\phi_0+22n\pi$ is a general expression for the phase change in a section of the filter at the mid-band frequency and $n$ may be any integer. Then the velocity $v$ of the wave must be such that $$\frac{\omega_0 l}{v}=\phi_0+2n\pi \quad (1)$$

from which $$v=\frac{\omega_0 l}{\phi_0+2n\pi} \quad (2)$$

where $l$ is the distance between sections of the filter, which in Figs. 5 and 6 is the distance between corresponding points in successive spaces between cylinders 65.

Any of several velocities may be chosen taking different values of $n$ and if the electrons are given a velocity $$u_0=\frac{\omega_0 l}{\phi_0+2n\pi} \quad (3)$$

the "electronic phase difference" will equal the "circuit phase difference" at mid-band frequency $\omega_0$. In order to make these phase differences equal over a band of frequencies including the mid-frequency, the rate of change of the two must be made the same in that region.

The electronic phase change over a distance $l$ at any frequency with $u_0$ as chosen above is $$\phi=\frac{\omega l}{u_0}=\frac{\omega l(\phi_0+2n\pi)}{\omega_0 l} \quad (4)$$

$$\phi=\frac{\omega}{\omega_0}(\phi_0+2n\pi) \quad (5)$$

and the rate of change of electronic phase with frequency is $$\frac{\partial\phi}{\partial\omega}=\frac{\phi_0+2n\pi}{\omega_0} \quad (6)$$

The rate of change of circuit phase with frequency $$\left(\frac{\partial\phi}{\partial\omega}, \text{circuit}\right)$$

should then be made substantially equal to the rate of change of electronic phase with frequency:

$$\frac{\partial\phi}{\partial\omega}, \text{circuit}=\frac{\phi_0+2n\pi}{\omega_0} \quad (7)$$

There are two ways of achieving this relation, (1) to vary $n$, (2) to vary $$\frac{\partial\phi}{\partial\omega}, \text{circuit}$$

The rate of change of circuit phase with frequency $$\left(\frac{\partial\phi}{\partial\omega}, \text{circuit}\right)$$

may be varied by using the well-known M derived filter sections commonly used in filter work. As M is made smaller $$\frac{\partial\phi}{\partial\omega}, \text{circuit}$$

at mid-band becomes smaller and by choosing M properly the desired above relation may be satisfied.

In the circuit of Fig. 5, M may be controlled by using one or more resonant openings such as 90, 91, and 92 in the baffles 58 as shown in Fig. 5B to couple between the resonators or filter sections. M is then controlled by adjusting the resonant frequencies and inductance/capacitance ratios of the openings.

In the circuit of Fig. 6 with the modification of Fig. 6A or Fig. 6B, M may be controlled by adjusting the length, height and thickness of the additional conductors 70 or 95 respectively connecting the sections.

Whereas the amplifiers illustrated in Figs. 5 and 6 may be constructed and arranged, as first described, so that the velocity of the electrons and the velocity of the waves are equal to each other, i. e., $$u_0=v=\omega l/\varphi \quad (8)$$

it has been pointed out with reference to Equation 3 that amplification can be had also with a very different relationship among the parameters. That relationship is expressed in Equation 3 in a form that makes it easy to see what a relatively great reduction in electron velocity $u_0$ (and, therefore, also of accelerating bias voltage) is possible by choice of the value of the integer $n$.

The Equation 3 can be restated, of course, by mere rearrangement of terms to show explicitly how any one of the parameters is related to the others. Thus, the length $l$ of each of the iterative sections of the transmission structure, i. e., the average intervals at which the interaction regions appear, is $$\left[\, l=\frac{u_0}{\omega_0}(\phi_0+2n\pi)\right] \quad (9)$$

Similarly, the phase shift $\phi_0$ in each section is $$\left[\phi_0=\frac{\omega_0 l}{u_0}-2n\pi\right] \quad (10)$$

Still another way of stating the relationship 3 is to compare the time $(\phi_0/\omega_0)$ required for the wave of prescribed velocity $v$ to traverse the distance $l$ with the time $(\phi_0/\omega_0 n/f_0)$ required for the electrons of prescribed velocity $u_0$ to traverse the same distance, whereupon it will be seen that the relationship 3 is inherently one in which the wave transit time is equal to the difference between the electron transit time and an integral number of periods of the wave being amplified. Others have since explained the operation of structures of the kind disclosed herein in terms of "spacial harmonics" of the waves being amplified. It will be understood, however, that the present invention is to be found in structures in which certain specified significant relationships obtain and not in any particular theory or form of explanation of their mode of operation.

Figure 7:
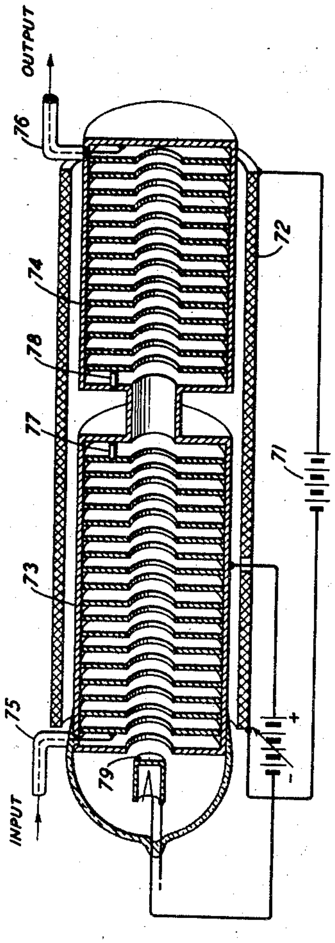
Fig. 7 illustrates a related type of device.

Fig. 7 is the same as a figure in a copending application, Serial No. 640,598, filed by the applicant January 11, 1946, now patent 2,637,001, issued April 28, 1953. It is reproduced here to illustrate a type of amplifier similar in some respects to that of the present invention.

The amplifier of the copending application as shown in Fig. 7 utilizes a wave guide structure with transverse baffles or partitions similar to those employed in Fig. 4 of the present invention to make the axial velocity of a wave transmitted therethrough sufficiently low. However, it will be noted that the high frequency wave is not transmitted directly through the device as in the various embodiments of the present invention which have been described. The Fig. 7 device employs two separate wave guide portions axially aligned but not electrically coupled. The input portion 73 is energized at high frequency from the input coaxial line 75 and is terminated by the resistor 77 which absorbs all of the high frequency energy transmitted through that portion of guide from the input coaxial. The output wave guide portion 74 is coupled to an output coaxial line 76 at the output end and is terminated at the other end by the resistor 78. An electron stream from the cathode 79 is projected along the axis through both guide portions. The solenoid 72 and energizing battery 71 are for maintaining a strong magnetic field in the direction of the electron path. All of the high frequency energy entering the device from the coaxial line 75 is utilized to modulate the electron stream as it passes through the guide portion 73 or is dissipated in losses or in the terminating resistor 77. The modulated electron stream then passes through the guide portion 74 and generates high frequency energy therein in accordance with the modulation and a high frequency output is delivered to the coaxial line 76. The coupling between input and output is electronic only and consequently a stoppage of the electron stream prevents transmission through the device. This is not the situation in the arangements shown in Figs. 1 to 6, inclusive, as in them there is a high frequency transmission path through regardless of the electron stream.

Figure 8:
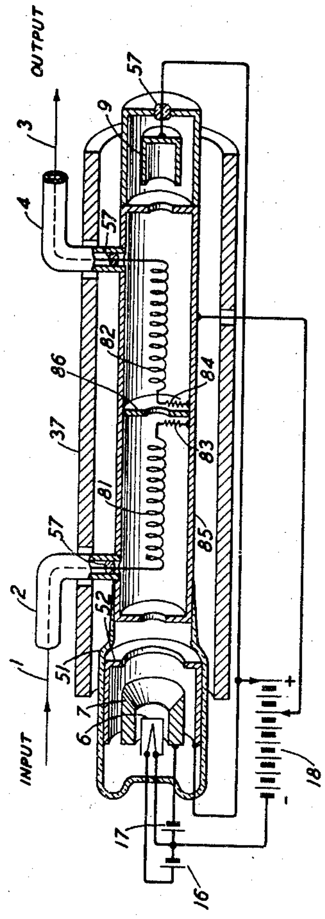
Fig. 8 shows an amplifier related to the type illustrated in Fig. 7.

Fig. 8 illustrates in somewhat schematic form a modification of Fig. 1 which operates in a manner similar to the device of the applicant's copending application, Serial No. 640,598, filed January 11, 1946, now patent 2,637,001, issued April 28, 1953, previously referred to which is shown in Fig. 7 and has been briefly described above. An electron stream is projected as in earlier figures from the cathode 6 through the coil parts 81 and 82 to the collector 9.

As will be seen, in Fig. 8 the helical coil corresponding to the single continuous coil 10 of Fig. 1 is in two parts 81 and 82 and the adjacent ends in the center of the device are terminated in resistors 83 and 84 connecting the ends to the shield 85. A shield 86 is interposed between the two parts of the coil. There is, then, no direct high frequency transmission path through the device. The high frequency energy applied at the input through the coaxial line 1, 2 is completely dissipated in the helix 8 in modulating the electron stream, in losses and in the resistor 83. The modulated stream then generates in the helix 82 high frequency energy corresponding to the modulation and this high frequency energy is delivered to the output through the coaxial line 3, 4. The device thus may function as an amplifier in the same general manner as the device of Fig. 7. For simplicity, direct connections are shown between the helix and the coaxial lines. Ordinarily, it will be desirable to use a different coupling arrangement, for instance, such as is shown in Fig. 1.

The performance of the Fig. 8 arrangement may be simulated by a special design of the Fig. 1 structure in which the loss introduced by the material 11 is made sufficiently large near the center of the helix that the input energy is completely absorbed and the output energy is entirely generated in the output end portion of the helix. Obviously, the loss material may be designed to similarly modify the operation of other structures.

Also, it is evident that the arrangements of Figs. 5 and 6 may be modified to operate in the manner of Fig. 8 either by suitable design of the loss members 61 in Figs. 5 and 69 in Fig. 6 or by dividing the wave guide into two parts as illustrated in Fig. 7.

Other modifications of the invention will be apparent and the applicant does not wish to be limited to the exact details illustrated and described but only by the scope of the appended claims.

What is claimed is:

1. An electron beam device comprising a continuous high frequency electromagnetic wave transmission circuit having input and output connections for said electromagnetic wave, means for directing an electron beam along said circuit in the region of the high frequency field of said circuit and in coupling relation thereto, and shielding means located along the path of the electron beam within said wave transmission circuit for substantially shielding the beam from the high frequency field in a number of successive regions, said successive regions being separated from each other along the path of the electron beam by other regions in which the electron beam passes through the high frequency field in coupling relation thereto.

2. Electronic apparatus for operation over a band of angular frequencies having a center angular frequency $\omega_0$ comprising an electron source and a target defining therebetween a path of flow for electrons, a continuous wave guiding structure forming a transmission path for an electromagnetic wave between an input connection and an output connection and including conductive portions for forming along the path of flow of the electrons a succession of regularly spaced regions of low electric field interspersed with regularly spaced gaps of high electric field, and means including a source of voltage providing a direct current velocity $u_0$ to the electron flow past said regions and gaps, the wave guiding structure being characterized in that the phase shift in radians between successive gaps is substantially equal to the difference of an integral number of $2\pi$ radians and the product of the center angular frequency $\omega_0$ and the spacing $l$ between successive gaps divided by the velocity $u_0$.

3. Space discharge apparatus for amplifying a high frequency electromagnetic wave comprising means defining a continuous wave transmission path capable of supporting a traveling electric field associated with said wave, said transmission path defining means comprising a plurality of resonators spaced regularly along said path, and means directing a beam of electrons along said path in an interacting relationship with said electric field at a velocity substantially equal to $$u_0=\frac{\omega_0 l}{\phi_0+2n\pi}$$

where $u_0$=velocity of electrons in said beam,
$\omega_0$=angular frequency of said wave,
$l$=average distance along the path between adjacent resonators,
$\phi_0$=the phase difference in radians between electric fields in the path, which are associated with two adjacent resonators,
$n$=any integer excluding zero.

4. Apparatus according to claim 3 which includes shielding means between said resonators along said path operative to reduce the interaction between said beam of charged particles and said electric field in regions of the path between the resonators.

5. A high frequency electromagnetic wave amplifying system comprising means defining a continuous wave transmission path connecting input and output circuits for said wave and capable of supporting a traveling electric field associated with said wave, said transmission path defining means comprising a plurality of resonators spaced regularly along said path, and means directing a beam of electrons along said path in an interacting relationship with said electric field at a predetermined velocity, the spacing of said resonators along the path being substantially equal to $$l=u_0\frac{(\phi_0+2n\pi)}{\omega_0}$$

where $l$=spacing of resonators
$u_0$=velocity of electrons in said beam
$\omega_0$=angular velocity of said wave
$\phi_0$=the phase difference in radians between electric fields in the path which are associated with two adjacent resonators
$n$=any integer excluding zero.

6. An electron beam translating device comprising a hollow pipe wave guide, a plurality of parallel transverse baffle plates therein, each of said plates having an aperture, means directing an electron beam along a path through said apertures, means coupling a high frequency electromagnetic wave input circuit to the said wave guide at a point, and means coupling a high frequency electromagnetic wave output circuit to the said guide at another point, the said input and output coupling points being spaced along the guide with the input coupling point nearer to the beginning of the said electron path than is the output coupling point and the guide providing a continuous high frequency electromagnetic wave transmission path between the two said points.

7. A device according to claim 6 including also means introducing high frequency power loss in predetermined amounts in the said guide in the spaces between at least some of the said transverse baffle plates.

8. An electron beam translating device comprising a hollow pipe electromagnetic wave guide, a plurality of parallel transverse baffle plates therein, each of said plates having a plurality of apertures of which one is centrally located, means directing an electron beam along a path through the said centrally located apertures, means coupling a high frequency input circuit to the said wave guide at a point and means coupling a high frequency output circuit to the said guide at another point, the said input and output coupling points being spaced along the guide with the input coupling point nearer to the beginning of the said electron path than is the output coupling point and the guide providing a continuous high frequency electromagnetic wave transmission path between the two said points.

9. An electron beam translating device comprising a hollow pipe electromagnetic wave guide, a plurality of parallel transverse baffle plates therein, each of said plates having mounted in it at substantially right angles thereto a hollow cylinder or tube extending from the said plate on at least one side and providing an opening through the plate, the said tubes in the several plates being aligned axially and spaced from each other along a common axis, means directing an electron beam at a suitable velocity along a path through the said tubes along the said common axis, means coupling a high frequency input circuit to the said wave guide at a point, and means coupling a high frequency output circuit to the said guide at another point, the said input and output coupling points being spaced along the guide with the input coupling point nearer to the beginning of the said electron path than is the output coupling point and the guide providing a continuous high frequency electromagnetic wave transmission path between the two said points.

10. A device according to claim 9 and having a band-pass filter transmission characteristic characterized in that the rate of change of phase difference between the voltages across two successive spaces between said tubes with change in frequency at the mid-frequency of the pass-band is substantially equal to $$\frac{l}{u_0}$$

where $l$=distance between said two successive spaces,
$u_0$=velocity of electrons in the said beam.

11. An electron beam translating device comprising a hollow pipe electromagnetic wave guide, a plurality of hollow cylinders or tubes within the said guide, said tubes being aligned axially and spaced from each other along a common axis extending along the said guide and each of the said tubes being connected to the shell of the guide by a conducting member transverse to the guide, means directing an electron beam along a path through the said tubes along the said common axis, means coupling a high frequency input circuit to the said wave guide at a point and means coupling a high frequency output circuit to the said guide at another point, the said input and output coupling points being spaced along the guide with the input coupling point nearer to the beginning of the said electron path than is the output coupling point and the guide providing a continuous high frequency electromagnetic wave transmission path between the two said points.

12. A device according to claim 11 including also means for introducing high frequency energy loss in predetermined amount in a region of said guide between the two said coupling points.

13. A device according to claim 11 comprising also additional conducting paths between the said tubes.

14. A device according to claim 13 and having a band-pass filter transmission characteristic characterized in that the rate of change of phase difference between said tubes with change in frequency at the mid-frequency of the pass-band is substantially equal to $$\frac{(\Phi_0+2n\pi)}{\omega_0}$$

where $\Phi_0$=the phase difference in radians between the voltages across two successive spaces between said tubes at the mid-frequency of the pass-band
$n$=any integer including zero
$\omega_0$=angular frequency at the mid-frequency of the pass-band 15. An electron beam translating device comprising a hollow pipe wave guide, a plurality of parallel transverse baffle plates therein, each of said plates having mounted in it at substantially right angles thereto a hollow cylinder or tube extending from the said plate on at least one side and providing an opening through the plate, each said plate having also an aperture therethrough in addition to the opening provided by said tube, the said tubes in the several plates being aligned axially and spaced from each other along a common axis, means directing an electron beam at a suitable velocity along a path through the said tubes along the said common axis, means coupling a high frequency input circuit to the said wave guide at a point, and means coupling a high frequency output circuit to the said guide at another point, the said input and output coupling points being spaced along the guide with the input coupling point nearer to the beginning of the said electron path than is the output coupling point and the guide providing a high frequency transmission path between the two said points.

16. A device according to claim 15 and having a band-pass filter transmission characteristic characterized in that the rate of change of phase difference between the voltages across two successive spaces between said tubes with change in frequency at the mid-frequency of the pass-band is substantially equal to $$\frac{(\Phi_0+2n\pi)}{\omega_0}$$

where $\Phi_0$=the phase difference in radians between the voltages across two successive spaces between said tubes at the mid-frequency of the pass-band
$n$=any integer including zero
$\omega_0$=angular frequency at the mid-frequency of the pass-band 17. A device according to claim 15 and having a band-pass filter transmission characteristic characterized in that the rate of change of phase difference between the voltages across two successive spaces between said tubes with change in frequency at the mid-frequency of the pass-band is substantially equal to $$\frac{l}{u_0}$$

where $l$=distance between said two successive spaces
$u_0$=velocity of electrons in the said beam 18. An electron beam translating device comprising a continuous high frequency electromagnetic wave transmission circuit having a plurality of filter sections in series and in cooperative relation to form a band-pass filter, means for coupling a high frequency input circuit to one end of said transmission circuit and means for coupling a high frequency output circuit to the other end of said transmission circuit whereby a high frequency electromagnetic wave may be transmitted through the filter sections from an input circuit to an output circuit and require a given period of time to progress between corresponding points in two adjacent said sections, and means for directing an electron beam along a path through the regions of the electric fields of said sections in sequence and in the direction of travel of said wave at such a velocity that electrons in the beam traverse each portion of said path between corresponding points of said regions in two adjacent sections in a period of time substantially the same as said period of time of wave progression between two adjacent sections.

19. An electron beam translating device comprising a continuous high frequency electromagnetic wave transmission circuit having a plurality of filter sections in series and in cooperative relation to form a band-pass filter, means for coupling a high frequency input circuit to one end of said transmission circuit and means for coupling a high frequency output circuit to the other end of said transmission circuit whereby a high frequency electromagnetic wave may be transmitted through the filter sections from an input circuit to an output circuit and require a given period of time to progress between corresponding points in two adjacent said sections, and means for directing an electron beam along a path through the regions of the electric fields of said sections in sequence and in the direction of travel of said wave at such velocity that electrons in the beam traverse each portion of said path between corresponding points of said regions in two adjacent sections in a period of time substantially equal to said period of time of wave progression between two adjacent sections plus the time of an integral number of periods of oscillation of said high frequency wave.

References Cited in the file of this patent

UNITED STATES PATENTS

| | | |
|---|---|---|
| 2,300,052 | Lindenblad | Oct. 27, 1942 |
| 2,338,441 | Kohl | Jan. 4, 1944 |
| 2,367,295 | Llewellyn | Jan. 16, 1945 |